(12) United States Patent
Kim et al.

(10) Patent No.: US 7,519,849 B2
(45) Date of Patent: Apr. 14, 2009

(54) TECHNIQUE FOR PROVIDING SERVICE PROCESSOR ACCESS TO CONTROL AND STATUS REGISTERS OF A MODULE

(75) Inventors: Han Bin Kim, Pleasanton, CA (US); Wei-Yu Chen, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 431 days.

(21) Appl. No.: 11/313,437

(22) Filed: Dec. 20, 2005

(65) Prior Publication Data

US 2007/0240007 A1 Oct. 11, 2007

(51) Int. Cl.
*G06F 1/12* (2006.01)
*G06F 5/06* (2006.01)

(52) U.S. Cl. ...................... 713/600; 713/601

(58) Field of Classification Search ................ 713/600, 713/601
See application file for complete search history.

(56) References Cited

U.S. PATENT DOCUMENTS 6,092,123 A * 7/2000 Steffan et al. ................. 710/8
6,721,277 B1 * 4/2004 Yu et al. ...................... 370/251
7,281,098 B2 * 10/2007 Hiraiwa et al. ............... 711/156
2002/0029358 A1 3/2002 Pawlowski et al.
2003/0033399 A1 2/2003 Garnett et al.
2003/0033460 A1 2/2003 King et al.
2003/0050998 A1 3/2003 Garnett et al.
2003/0101304 A1 5/2003 King et al.
2004/0153786 A1 8/2004 Johnson et al.
2007/0027948 A1 * 2/2007 Engebretsen ................ 709/203

* cited by examiner

*Primary Examiner*—Thomas Lee
*Assistant Examiner*—Michael J Brown
(74) *Attorney, Agent, or Firm*—Dorsey & Whitney LLP

(57) ABSTRACT

A technique for providing service processor (SP) access to registers, e.g., control and status registers (CSRs), located within hardware modules of a computer system, ensures access to the CSRs within a predetermine time period. The computer system includes a host module (HM) and a plurality of client modules (CMs). The CMs each include one or more associated registers, and each of the CMs is separately addressable. At least one of the CMs operates at a different clock frequency than the remaining CMs and includes a clock synchronizer, which provides a clock signal to facilitate reading of or writing to the associated registers of the CM by the HM.

22 Claims, 6 Drawing Sheets

1

TECHNIQUE FOR PROVIDING SERVICE PROCESSOR ACCESS TO CONTROL AND STATUS REGISTERS OF A MODULE

BACKGROUND

1. Field of the Invention

The present invention is generally directed to a computer system and, more specifically, to a computer system comprising a host module and a plurality of client modules, each including one or more associated registers, that are accessible by a service processor.

2. Description of the Related Art

Serial buses have been widely implemented in conjunction with various hardware platforms. For example, the inter-integrated circuit (I2C) bus implements two bus lines, i.e., a serial data line (SDA) and a serial clock line (SCL). Each device that is connected to the I2C bus is software addressable by a unique address and a simple master/slave relationship exists between the devices. The I2C bus is a true multi-master bus that includes collision detection and arbitration to prevent data corruption, if two or more masters simultaneously initiate data transfer. Another example of a serial bus is the serial peripheral interface (SPI) bus, which in a simple embodiment is a four wire full duplex synchronous serial data link. The SPI bus has been utilized to connect peripherals to each other and to microprocessors. In general, the SPI bus is a three plus 'n' wire interface, where 'n' is the number of devices connected to the bus. In an SPI bus implementation, three wires carrying information between devices connected to the bus, i.e., two of the three lines of the bus transfer data (one line for each direction), and the third line is a serial clock. A dedicated select line is also typically implemented between a master and each slave.

Another serial bus that has been widely implemented in the automotive environment is the controller area network (CAN) bus, which implements relatively complex coded messages. All modules connected to the CAN bus utilize the same timing and participate in each communication. Similar to the I2C bus, the CAN bus utilizes resistors to pull the various bus lines to a resting state. The universal serial bus (USB) is a serial bus that has been widely implemented for connecting personal computers (PCs) to peripherals. The USB is a relatively complex bus that is focused on mass-market products, such as PCs. As another example of a serial bus, the IEEE 1394 bus has been widely utilized to link set-top boxes, digital versatile disks (DVDs) and digital televisions (TVs). The 1394 bus implements a pair of twisted wire pairs, one wire pair for data and the other wire pair for a clocking strobe.

Recently, at least one manufacturer has implemented service processors (SPs) in conjunction with a server system to control/monitor operation of system hardware modules, such as central processing units (CPUs) and application specific integrated circuits (ASICs), within the server system. In general, a SP initiates control and status checks to control and status registers (CSRs) located within one or more CPUs and/or ASICs. Typically, software running on a SP interacts with the system hardware through writing and reading the CSRs. In general, CSRs have been software accessible by the SP and hardware accessible by the system hardware. Typically, software writes to the CSRs and hardware reads the CSRs to configure hardware behavior and to initiate hardware processes. In a usual case, hardware writes to the CSRs to report status, including detected errors. The status is then read by the SP to determine the state of the hardware. In at least one SPARC® processor design, an address space identifier (ASI) bus has been utilized by an SP to access CSRs of hardware modules to, for example, diagnose module associated problems.

SPARC architecture based processors are available from Sun Microsystems, Inc., Palo Alto, Calif. SPARC trademarks are used under license and are trademarks or registered trademarks of SPARC International, Inc. in the United States and other countries. Products bearing SPARC trademarks are based upon an architecture developed by Sun Microsystems, Inc.

As noted above, SPs have accessed CSR registers via the ASI bus. Unfortunately, when a SP accesses CSRs through the ASI bus, the SP may not be provided access to the CSRs within a desired time frame. This is due to the fact that other processes may be utilizing the ASI bus when the SP desires access to a CSR. Furthermore, modules that include CSRs may operate at different clock frequencies, which complicates the reading/writing of CSRs by an SP.

What is needed is a reliable technique for providing service processor (SP) access to control and status registers (CSRs) of different hardware modules within a predetermined time period. It would also be desirable if the technique readily facilitated access to hardware modules that operate at different clock frequencies.

SUMMARY

The present invention is generally directed to a technique for providing service processor (SP) access to registers, e.g., control and status registers (CSRs), located within hardware modules of a computer system. In one embodiment the computer system includes a host module (HM) and a plurality of client modules (CMs). The CMs each include one or more associated registers and each of the CMs is separately addressable. At least one of the CMs operates at a different clock frequency than the remaining CMs and includes a clock synchronizer, which provides a clock enable signal to facilitate reading of or writing to the associated registers of the CM by the HM.

According to another aspect of the present invention, a service processor (SP) that is in communication with the HM provides a message to the HM to initiate a read of or a write to the registers of one of the CMs. The CMs may be integrated within a different functional units, e.g., memory-control units (MCUs) and/or a system interface unit (SIU). In one embodiment, the computer system includes a control and status register (CSR) bus that couples the HM to the CMs. The CSR bus includes separate data-in lines, coupling the HM to each of the CMs, and a common data-out line coupling the HM to all of the CMs. The HM receives data from an addressed one of the CMs on an associated one of the data-in lines and provides data to the CMs on the data-out line. In one embodiment, the one or more associated registers each include at least one control register and at least one status register.

According to another aspect of the present invention, the CSR bus further comprises a common shift control line, a common read control line and a common write control line coupling the HM to the CMs. In this embodiment, the HM asserts a read signal on the read control line and an addressed one of the CMs responds by providing data to the HM on an associated one of the data-in lines responsive to the clock enable signal, when the HM asserts a shift signal on the shift control line. According to another aspect of the present invention, when the HM asserts a shift signal on the shift control line, all of the CMs store, responsive to the clock enable signal, at least temporarily, data and an address provided on a data-output line of the HM. According to another embodiment, each of the CMs compare the address provided by the HM with an associated address and a CM whose associated address matches the address provided by the HM stores the data in the one or more associated registers, responsive to a write signal on the write control line. In various embodiments, the computer system may be embodied in one or more design files stored on one or more computer-readable storage media.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED
EMBODIMENT(S)

As is noted above, service processors (SPs) have been implemented within server systems to control operation of system hardware modules, such as central processing units (CPUs) and application specific integrated circuits (ASICs). The SP has controlled the system hardware modules through writing to associated control registers and has determined the results of the operation of the modules through reading associated status registers. The control registers and the status registers, i.e., control and status registers (CSRs), are located in each of the modules. According to one aspect of the present invention, a dedicated CSR bus is implemented between a host module (HM) and a plurality of client modules (CMs) to allow an SP to access CSRs located within various functional units inside a CPU, e.g., memory control units (MCUs) and system interface units (SIUs). By implementing a dedicated CSR bus between the HM and CMs, an SP is able to access CSRs within the CMs in a pre-determined time period, which guarantees a set latency for SP access. In this manner, an SP can timely access, i.e., write to control registers and/or read status registers, mission-critical CSRs. According to one aspect of the present invention, a dedicated CSR bus is configured to minimize control logic and the number of bus lines, in order to reduce consumed chip area.

According to an aspect of the present invention, at least one of the CMs operates at a different clock frequency than the remaining CMs. According to this aspect of the present invention, at least one of the CMs includes a clock synchronizer to synchronize information transfer between the CM and the HM. According to another embodiment, each of the CMs include a clock synchronizer. In various embodiments, a computer system implementing aspects of the present invention may be embodied in one or more design files stored on one or more computer-readable storage media, e.g., random access memory (RAM), read-only memory (ROM), flash memory, a removable storage media, etc.

Figure 1:
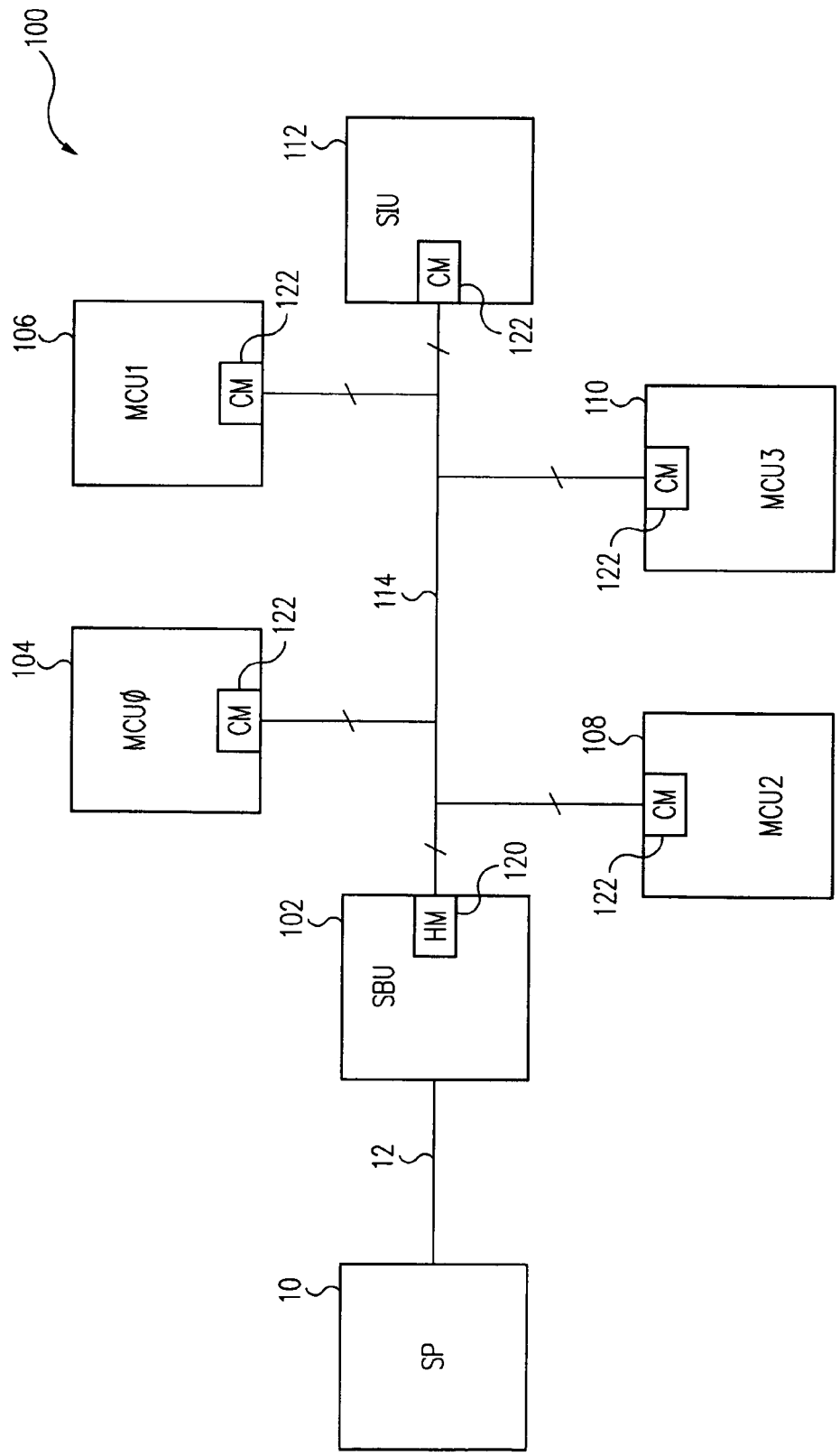
FIG. 1 is an exemplary electrical block diagram of a relevant portion of a computer system, configured according to one embodiment of the present invention.

With reference to FIG. 1, a relevant portion of an exemplary computer system 100, configured according to one embodiment of the present invention, is depicted. As is shown, a service bootlink unit (SBU) 102 of the system 100 is in communication with a service processor (SP) 10. The SBU 102 provides a communication interface between the SP 10 and the system 100. The SP 10 communicates with the SBU 102 over a link 12, which may be a serial link. The SP 10 may be implemented as an integrated component, e.g., a microprocessor, of the system 100 or as a separate stand-alone system, e.g., a workstation, personal computer (PC), etc. The SBU 102 includes a host module (HM) 120, which is coupled to a control and status register (CSR) bus 114. Client modules (CMs) 122, located within functional units, e.g., memory control units (MCUs) 104, 106, 108 and 110 and system interface unit (SIU) 112, are also coupled to the CSR bus 114. In this manner, the CSR bus 114 provides communication paths between the HM 120 and the CMs 122.

Figure 2A:
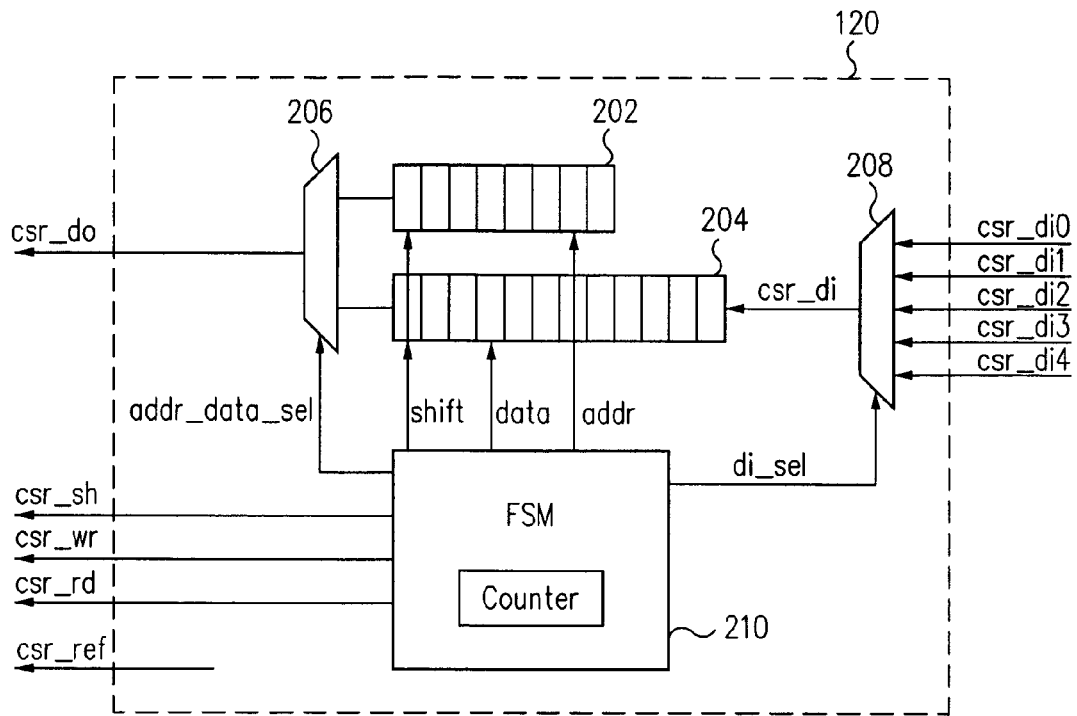
FIG. 2A depicts a relevant portion of an exemplary host module (HM) electrical diagram, in block and schematic form, configured according to one embodiment of the present invention.

With reference to FIG. 2A, a relevant portion of the host module (HM) 120 is depicted. As is shown, the HM 120 includes a finite state machine (FSM) 210 that controls communication across the CSR bus 114. The FSM 210 also controls what information is provided onto the CSR bus 114 (from the HM 120) by loading information (provided from, for example, SP 10) into a data buffer 204 and an address buffer 202. The FSM 210 provides an output select (addr_data_sel) signal that controls which of the buffers 202 and 204 multiplexer 206 selects to provide information on a data-out (csr_do) line of the CSR bus 114. That is, the FSM 210 determines whether an address is provided from the buffer 202 or data is provided from the buffer 204. The FSM 210 also controls a multiplexer 208 by providing an input select (di_sel) signal, which determines which of the CSRs provide data to the buffer 204 on data-in (csr_di0, csr_di1, csr_di2, csr_di3 and csr_di4) lines of the CSR bus 114, when the FSM 210 has initiated a read CSR operation. As is discussed in further detail below, the FSM 210 also provides a shift (csr_sh) signal, a write (csr_wr) signal, a read (csr_rd) signal and a clock (csr_ref) signal on shift (csr_sh), write (csr_wr), read (csr_rd) and clock (csr_ref) control lines, respectively, of the CSR bus 114 to facilitate communication between the HM 120 and the CMs 122. When the SP 10 sends a message to the SBU 102 that requires a read of a CSR in one of the CMs 122, the message from the SP 10 includes an address of the CSR that is to be read. When the SP 10 provides a write message to the HM 120, the write message includes an address and data that is to be written to the addressed CSR within one of the CMs 122.

Figure 2B:
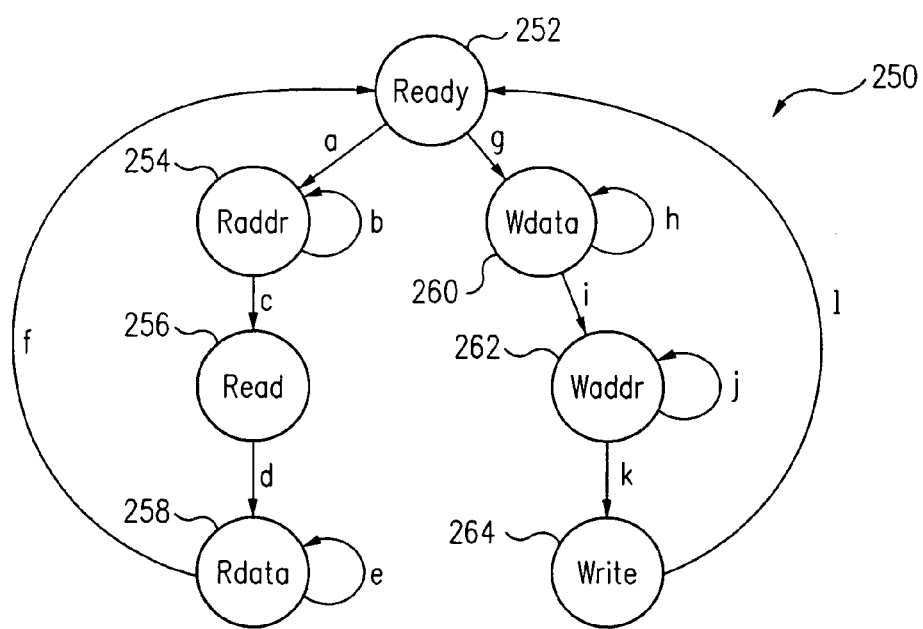
FIG. 2B depicts a state diagram of a finite state machine (FSM) of the HM of FIG. 2A.

Turning to FIG. 2B, a state diagram 250 is provided to better illustrate the operation of the FSM 210 of FIG. 2A.

Initially, the FSM 210 is in a ready state 252. When a CSR read message is received (from the SP 10) by the HM 120, control transitions, along path 'a', from state 252 to state 254. In state 254, the FSM 210 initiates transfer of an address loaded into the buffer 202 of the HM 120 to the CMs 122 coupled to the CSR bus 114. As is discussed further below, each of the CMs 122 receives the address and compares the address to one or more stored addresses to determine whether an associated CSR is being addressed. The FSM 210 asserts the shift (csr_sh) signal to initiate transfer of the address across the CSR bus 114. In one implementation an 8-bit address is utilized and when eight clock (csr_ref) signals are provided to the CMs 122, the address is transferred from the buffer 202 to the CMs 122. When the counter in the FSM 210 transitions to zero (transfer along path 'b' is discontinued), the FSM 210 transitions, along path 'c', to state 256. In state 256, the FSM 250 asserts a read signal on the read (csr_rd) line and control transitions, along path d, to state 258. In state, the FSM 210 asserts a shift (csr_sh) signal to read data from the addressed CSR, of 258an appropriate one of the CMs 122. When the read data shift count is zero (transfer along path 'e' is discontinued), control transitions, along path 'f', to state 252. As noted above, the FSM 210 selects which one of the CSRs is to provide data to the buffer 204 by providing the input select (di_sel) signal on an input select line of the multiplexer 208.

When the FSM 210 is in the ready state 252 and a write request is received from the SP 10, the FSM 210 transitions to state 260, along path 'g', and provides a select (addr_data_sel) signal on the select line of the multiplexer 206 to select the data buffer 204, which is loaded with data to be transferred to a CSR within one of the CMs 122. In state 260, the FSM 210 asserts a shift (csr_sh) signal on the shift (csr_sh) line to begin providing data out of the buffer 204 on the data-out (csr_do) line responsive to the clock (csr_ref) signal. Each of the CMs 122 receive the data and store the data within a plurality of flip-flops, which are discussed further below in conjunction with FIG. 3A. In one exemplary embodiment, 64-bits of data are provided and, thus, after sixty-four clock cycles the data is clocked out of the buffer 204 and into flip-flops of the CMs 122. Upon completing the data transfer in state 260 (transfer along path 'h' is discontinued), control transfers, along path 'i', to state 262. In state 262, the FSM 210 initiates a transfer of an address loaded in the buffer 202 to the CMs 122. As before, to clock the address out of the buffer 202, the FSM 210 asserts a shift (csr_sh) signal on the shift line (shift control line) after selecting the buffer 202 with the output (addr_data_sel) signal. From state 262, after the address has been shifted out of the buffer 202 (transfer along path 'j' is discontinued), control transfers, along path 'k', to state 264. In state 264, the FSM 210 asserts a write (csr_wr) signal on the write (csr_wr) line, which causes an addressed CSR of an associated CM 122 to store the data written to its flip-flops in a local CSR.

Depending upon the frequency of a local clock, i.e., cpu_clk/ioclk (see FIG. 3A), of the CM 122, as compared to the clock (csr_ref) signal provided by the HM 120, a synchronizer 140 may or may not be implemented. To ensure reliable sampling it is generally desirable to select a clock (csr_ref) signal that is at least four times lower in frequency than the cpu_clock/ioclk signal. For example, if the cpu_clk signal has a frequency of 2.66 GHz and the ioclk signal has a frequency of 1.33 GHz, a csr_ref signal having a frequency of 333 MHz may be selected. It should be appreciated that, depending upon the design implemented, if the local clock frequency of the CM 122 is the same as the clock frequency provided by the HM 120, a synchronizer may not be necessary. However, according to various aspects of the present invention, a clock synchronizer is provided such that modules that operate at different frequencies, as well as at different frequencies from the clock frequency provided by the HM 120, are able to communicate with the HM 120. As noted with respect to FIG. 2B, when a read operation is requested, the FSM 210 only clocks out an address. However, when a write operation is requested, the FSM 210 clocks out the data on the data-out (csr_do) line, followed by the address.

Figure 3A:
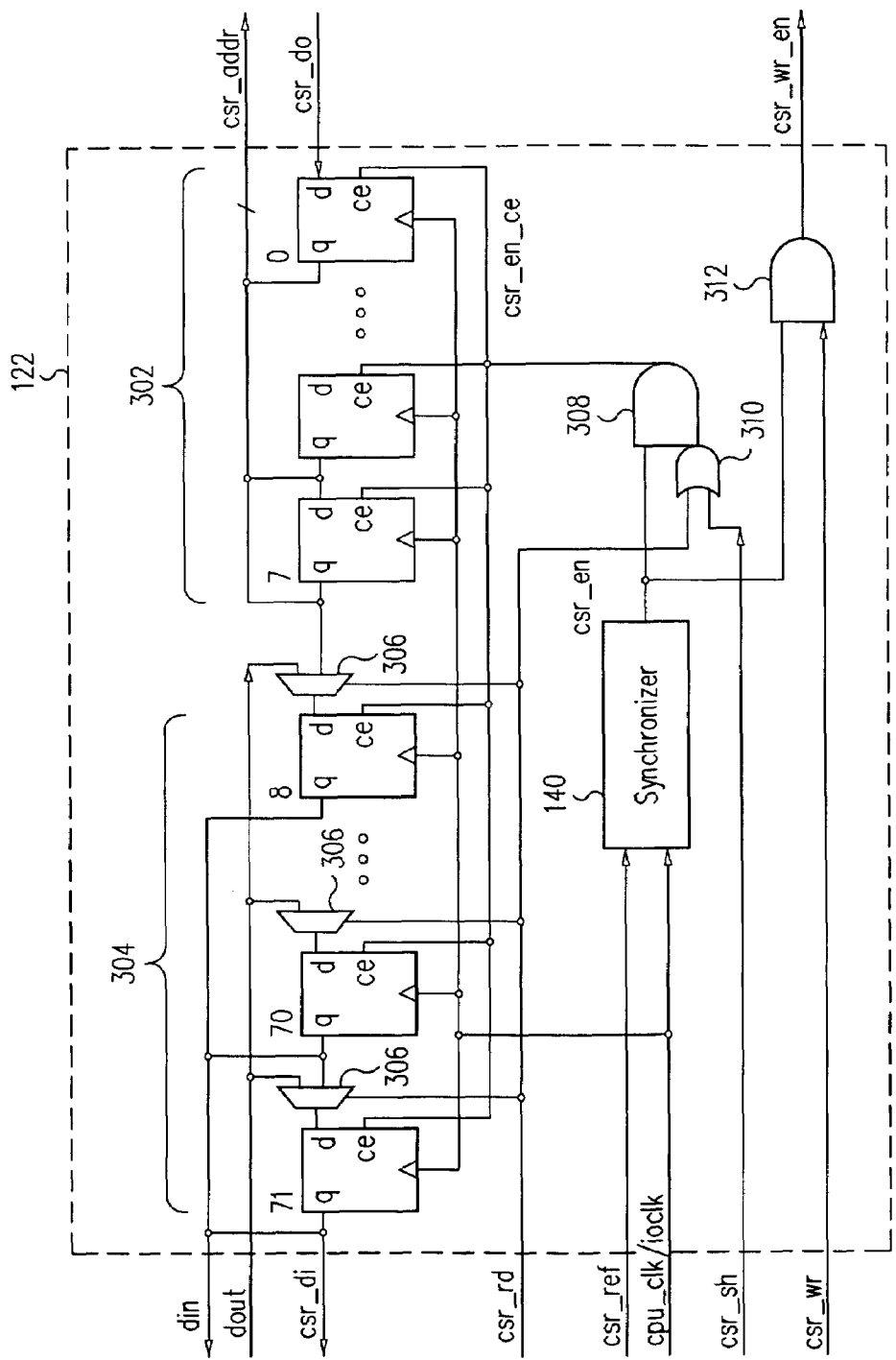
FIG. 3A is an electrical diagram, in block and schematic form, of a relevant portion of a client module (CM), configured according to one aspect of the present invention.

As is shown in FIG. 3A, in an exemplary embodiment, data block 304 include 64 flip-flops (data transfer registers), and address block 302 includes eight flip-flops (address transfer registers). If a read operation is to occur, the FSM 210 asserts a read (csr_rd) signal on a read (csr_rd) line after outputting an address on the data-out (csr_do) line. The read (csr_rd) signal causes multiplexers 306 to select an input from a data-out (dout) bus, which is coupled to an addressed CSR register 400 (see FIG. 4B). The addressed CSR register 400 is determined by an address decoder 452, which provides. a select (csr_sel) signal to multiplexer 454 to select an addressed CSR register 400. In this manner, data is loaded from an addressed one of the CSR registers 400 into the data transfer registers (i.e., the data block 304), which are then clocked when the FSM 210 asserts a shift (csr_sh) signal on the shift (csr_sh) line to provide the data to the HM 120. As previously mentioned, a clock synchronizer 140 functions to synchronize the clock (csr_ref) signal, provided by the HM 120, with a local clock signal (cpu_clk/ioclk) that clocks transfer registers of a CM 122. The synchronizer 140 provides an enable (csr_en) signal, which, when a shift (csr_sh) signal or a read (csr_rd) signal is provided by the HM 120, provides a chip enable (csr_en_ce) signal to a chip enable (ce) input of each of the flip-flops in the address block 302 and data block 304. Thus, when a cpu_clk/ioclk signal is received by the flip-flops and the csr_en_ce signal is asserted, the flip-flops are clocked. When data is being clocked through the data transfer registers and out the input (csr_di) line to the HM 120, the multiplexers 306 connect a 'Q' output of one flip-flop to a 'D' input of a next flip-flop of the data transfer registers.

Figure 3B:
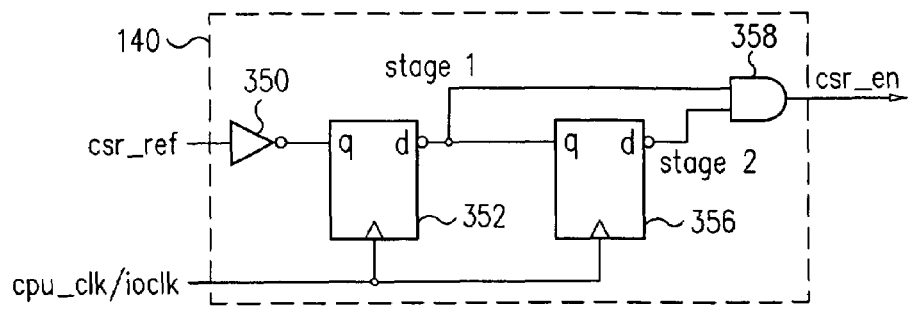
FIG. 3B is an electrical schematic of a clock synchronizer of the CM of FIG. 3A.
Figure 3C:
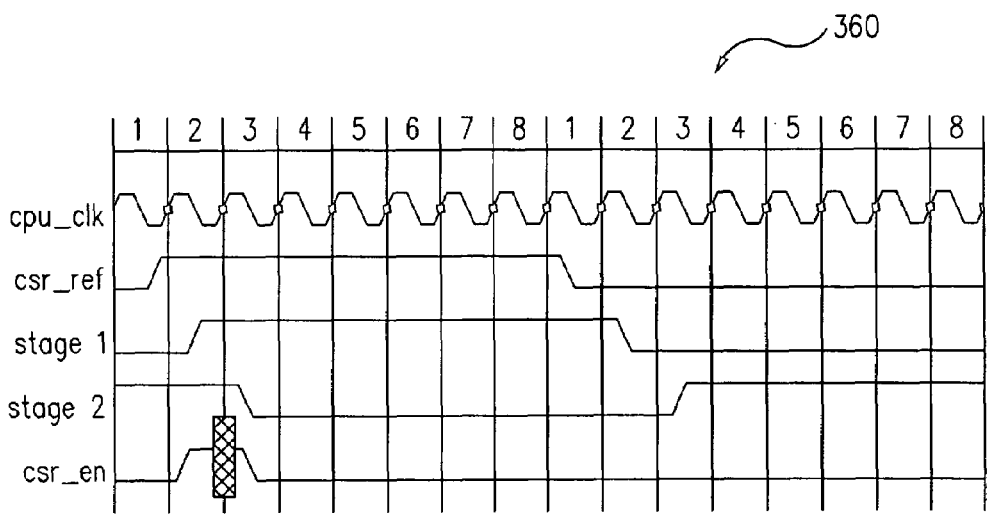
FIG. 3C is a timing diagram depicting the relationship between various signals of the synchronizer of FIG. 3B.

With reference to FIG. 3B, the synchronizer 140 includes an inverter 350, whose output is coupled to a 'D' input of a flip-flop 352, whose 'Q-not' output is coupled to a first input of an AND gate 358. The 'Q-not' output of the flip-flop 352 is also coupled to a 'D' input of flip-flop 356, whose 'Q-not' output is coupled to a second input of the AND gate 358. Operation of the synchronizer 140 may be better understood with reference to FIG. 3C. More specifically, FIG. 3C shows a timing diagram 360, which illustrates that the synchronizer 140 provides an enable (csr_en) signal when the output (stage 1) of the flip-flop 352 and the output (stage 2) of the flip-flop 356 are both asserted. Thus, when the csr_en signal is asserted, a CPU clock or I/O clock (cpu_clk/ioclk) signal, depending on the module, clocks the flip-flops and shifts the data in the transfer registers, assuming that the FSM 210 has asserted a shift (csr_sh) signal on the shift (csr_sh) line. In the example shown in FIG. 3C, the frequency of the cpu_clk signal is sixteen times the frequency of the csr_ref signal. However, it should be appreciated that the frequency of the cpu_clk signal may be a different multiple of the csr_ref signal.

Figure 3D:
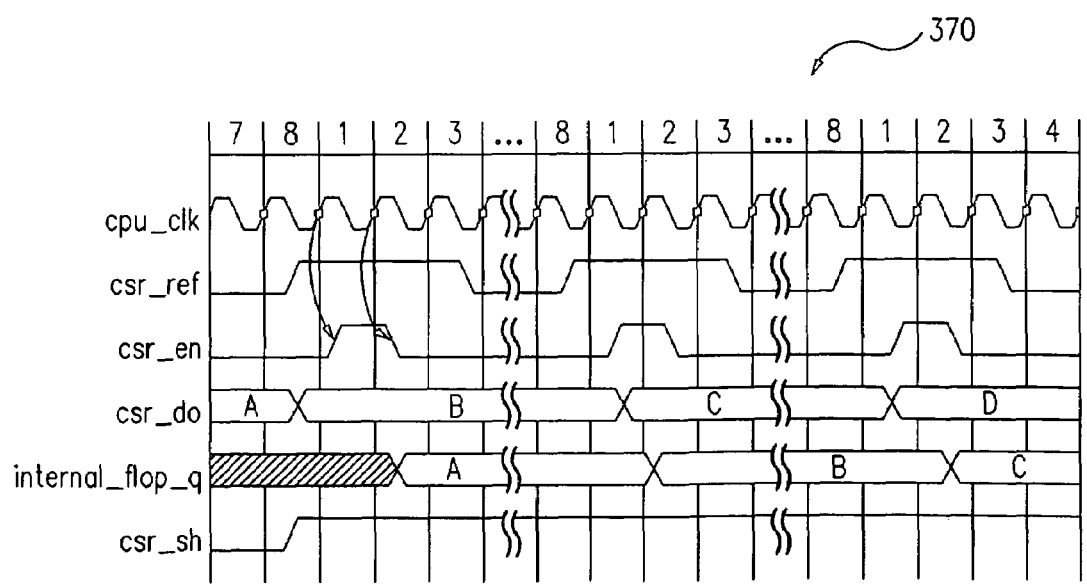
FIG. 3D is a timing diagram depicting the operation of the CM of FIG. 3A, when the CM is clocked at a central processing unit (CPU) clock frequency.

Turning to FIG. 3D, a timing diagram 370 depicts the transfer of data from the HM 120 (on the csr_do line), under the control of the FSM 210, into the transfer registers of the blocks 302 and 304, during a write operation when a shift (csr_sh) signal is asserted by the FSM 210. As discussed above, the information (i.e., data and address) provided on the csr_do line, by the HM 120, is serially clocked into the transfer registers responsive to the shift (csr_sh) signal and an enable (csr_en) signal.

Figure 4A:
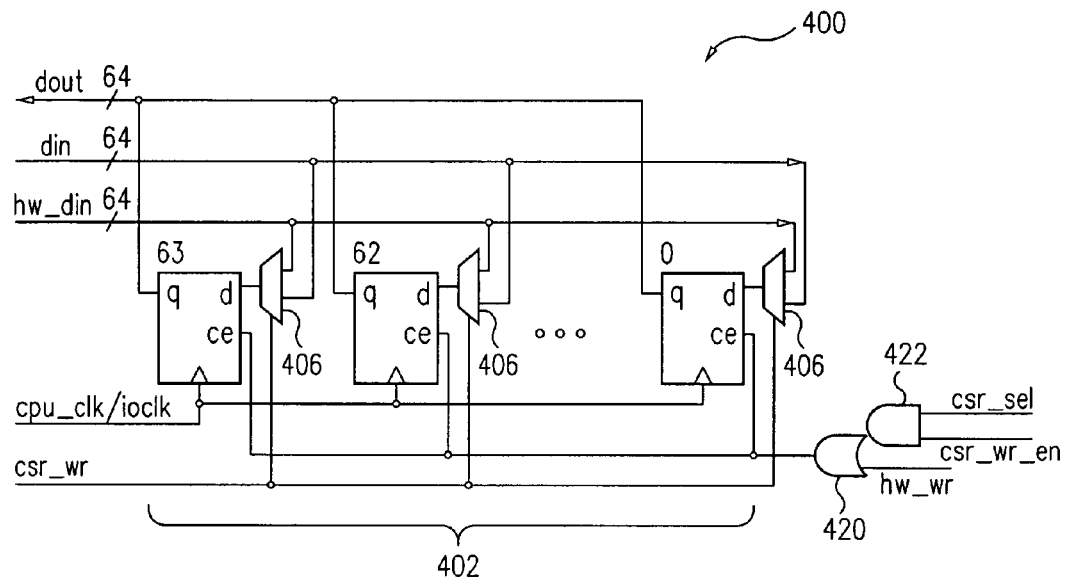
FIG. 4A depicts an electrical schematic of a relevant portion of a local control and status register (CSR) of the CM of FIG. 3A.
Figure 4B:
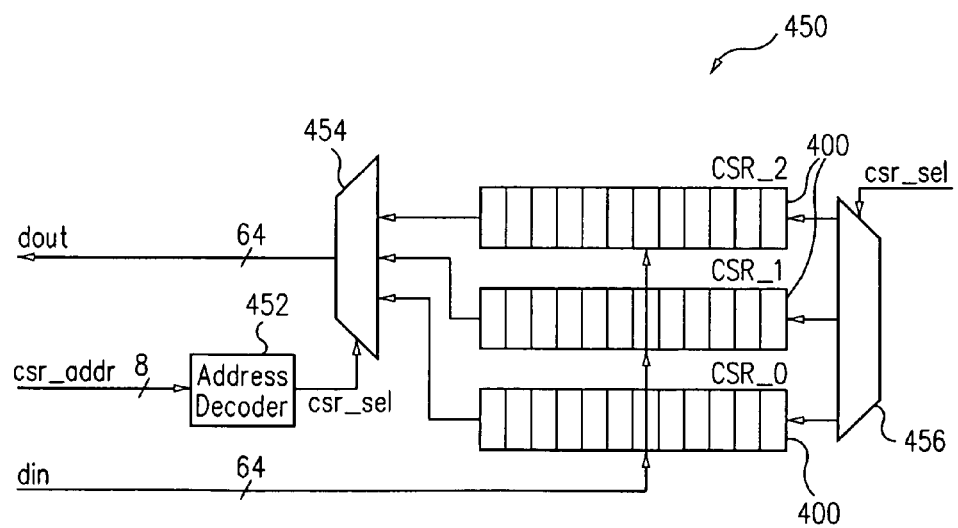
FIG. 4B depicts an electrical diagram, in block and schematic form, of a relevant portion of a local CSR including multiple CSRs.

With reference to FIG. 4A, a relevant portion of a local CSR 400 is depicted. As is shown, the CSR 400 includes 64 flip-flops, i.e., flip-flops 0-63, which may be loaded from/to the data transfer registers of the data block 304 of FIG. 3A, and control logic (i.e., OR gate 420 and AND gate 422) for controlling clocking of data into and out of the flip-flops. More specifically, registers 402 provide data for the transfer registers of the data block 302, via a data-output (dout) line, and may receive data from the transfer registers on data-in (din) lines. The registers 402 may also receive data from hardware logic (not shown), via hardware data in (hw_din) lines. Data is written from the transfer registers of the data block 304 into the registers 402 when the FSM 210 asserts a write signal on the write (csr_wr) line and address decoder 452 provides an address match on select (csr_sel) lines of multiplexer 456. With reference to FIG. 4B, the address decoder 452 receives an address on address (csr_addr) lines, which correspond to the address (csr_addr) lines of the transfer registers of the address block 302 of FIG. 3A. The address decoder 456 also provides the select (csr_sel) signal to select lines of multiplexer 456 to select which of the CSRs 400 are to receive input data on the data-in (din) lines.

Figure 5:
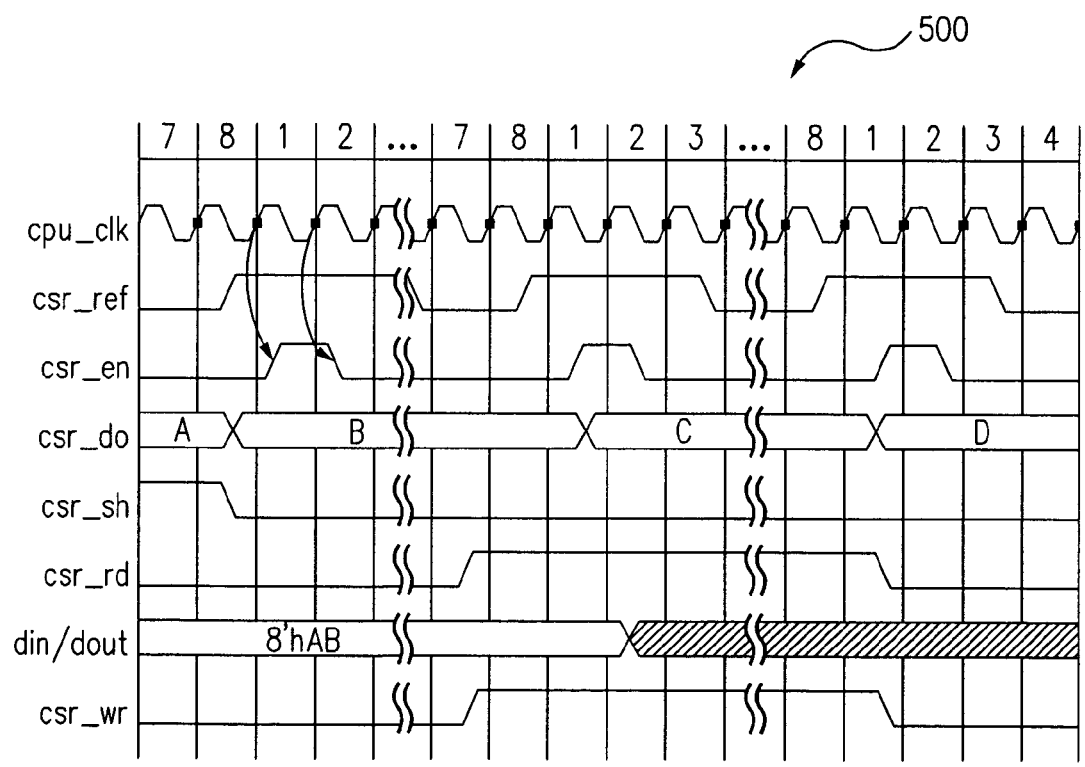
FIG. 5 is a timing diagram depicting various signals associated with the CM of FIG. 3A during a read from or a write to the registers shown in FIG. 4A.

With reference to FIG. 5, a timing diagram 500 is depicted which illustrates the transfer of data to an addressed CSR register when a write (csr_wr) signal is asserted on a write (csr_wr) line or a read from the CSR registers to the transfer registers of the data block 304 when a read (csr_rd) signal is asserted on a read (csr_rd) line. Similarly, data is provided to the HM 120 from an addressed one of the CMs 122 responsive to a shift (csr_sh) signal and an enable (csr_en) signal, after the data is loaded into the data transfer registers of data block 304 (responsive to a read (csr_rd) signal and an enable (csr_en) signal).

Accordingly, a computer system has been described herein which advantageously allows a service processor (SP) to access control and status registers (CSRs) of a client module (CM) across a dedicated CSR bus. Implementation of a dedicated CSR bus allows the SP to access the CSRs through a host module (HM) within a predetermined time period, allowing the SP to have access to mission critical CSRs. Advantageously, according to various implementations of the present invention, an HM may communicate with CMs that operate at different frequencies.

What is claimed is:

1. A computer system, comprising:
a host module (HM); and a plurality of client modules (CMs) in communication with the HM and each including one or more associated registers, wherein each of the CMs is separately addressable and at least one of the CMs operates at a different clock frequency than the remaining CMs and includes a clock synchronizer, and wherein the clock synchronizer provides a clock enable signal to facilitate reading of or writing to the associated registers of the at least one of the CMs by the HM; and
a control and status register (CSR) bus coupling the HM to the CMs, wherein the CSR bus includes separate data-in lines coupling the HM to each of the CMs and a common data-out line coupling the HM to all of the CMs and the HM receives data from an addressed one of the CMs on an associated one of the data-in lines and provides data to the CMs on the data-out line, and wherein the one or more associated registers each include at least one control register and at least one status register.

2. The system of claim 1, wherein a service processor (SP) in communication with the HM provides a message to the HM to initiate a read of or a write to the registers of one of the CMs.

3. The system of claim 1, wherein each of the CMs is integrated within a different functional unit.

4. The system of claim 3, wherein the functional unit is one of a memory control unit (MCU) or a system interface unit (SIU).

5. The system of claim 1, wherein the CSR bus further comprises a common shift control line, a common read control line and a common write control line coupling the HM to the CMs, and wherein when the HM asserts a read signal on the read control line an addressed one of the CMs provides data to the HM on an associated one of the data-in lines responsive to the clock enable signal when the HM asserts a shift signal on the shift control line.

6. The system of claim 1, wherein the CSR bus further comprises a common shift control line, a common read control line and a common write control line coupling the HM to the CMs, and wherein when the HM asserts a shift signal on the shift control line all of the CMs store, at least temporarily, data and an address provided, on the data-out line, from the HM responsive to the clock enable signal.

7. The system of claim 6, wherein each of the CMs compare the address provided by the HM with an associated address and the CM whose associated address matches the address provided by the CM stores the data in the one or more associated registers responsive to a write signal provided by the HM on the write control line.

8. The system of claim 1, wherein the system is embodied as one or more design files stored on one or more computer readable storage media.

9. A communication system, comprising:
a host module (HM);
a plurality of client modules (CMs) each including one or more associated registers and a clock synchronizer, wherein each of the CMs is separately addressable and at least one of the CMs operates at a different clock frequency than the remaining CMs, and wherein the clock synchronizer provides a local clock enable signal that synchronizes a frequency of an HM clock signal provided by the HM to a local clock signal of the CMs to facilitate reading of or writing to the registers by the HM; and
a control and status register (CSR) bus coupling the HM to the CMs, wherein the CSR bus includes separate data-in lines coupling the HM to each of the CMs and a common data-out line coupling the HM to all of the CMs and the HM receives data from an addressed one of the CMs on an associated one of the data-in lines and provides data to the CMs on the data-out line.

10. The system of claim 9, further comprising:
a service processor (SP) in communication with the HM, wherein the SP provides a message to the HM to initiate a read of or a write to the registers of one of the CMs.

11. The system of claim 9, wherein each of the CMs is integrated within a different functional unit.

12. The system of claim 11, wherein the functional unit is one of a memory control unit (MCU) or a system interface unit (SIU).

13. The system of claim 9, wherein the one or more associated registers each include at least one control register and at least one status register.

14. The system of claim 9, wherein the CSR bus further comprises a common shift control line and a common read control line coupling the HM to the CMs, and wherein when the HM asserts a read signal on the read control line an addressed one of the CMs provides data to the HM on an associated one of the data-in lines responsive to the local clock enable signal when the HM asserts a shift signal on the shift control line.

15. The system of claim 9, wherein the CSR bus further comprises a common shift control line and a common write control line coupling the HM to the CMs, and wherein when the HM asserts a shift signal on the shift control line all of the CMs store, at least temporarily, data and an address provided, on the data-out line, from the HM responsive to the local clock enable signal.

16. The system of claim 15, wherein each of the CMs compare the address provided by the HM with an associated address and the CM whose associated address matches the address provided by the HM stores the data in the one or more associated registers responsive to a write signal provided by the HM on the write control line.

17. A method for facilitating communication between a host module (HM) and a plurality of client modules (CMs), comprising:
 addressing one of a plurality of CMs, wherein each of the CMs include one or more associated registers and each of the CMs is separately addressable, and wherein at least one of the CMs operates at a different clock frequency than the remaining CMs; providing a clock enable signal, by an addressed one of the CMs, to facilitate reading of or writing to the registers of the addressed CM by the HM, wherein the HM is in communication with a service processor (SP); and coupling the HM to the CMs with a control and status register (CSR) bus, wherein the CSR bus includes separate data-in lines that couple the HM to each of the CMs and a common data-out line that couples the HM to all of the CMs.

18. The method of claim 17, wherein the SP provides a message to the HM to initiate a read of or a write to the registers of one of the CMs.

19. The method of claim 17, further comprising: receiving data from the registers of an addressed one of the CMs on an associated one of the data-in lines, wherein the registers include at least one control register and at least one status register.

20. The method of claim 17, further comprising: providing an address to the CMs on the data-out line, wherein the CSR bus further comprises a common shift control line and a common read control line coupling the HM to the CMs; asserting, by the HM, a read signal on the read control line; and responsive to the clock enable signal, providing data from the addressed one of the CMs to the HM on the associated one of the data-in lines when the HM asserts a shift signal on the shift control line.

21. The method of claim 17, further comprising: providing, from the HM, data and an address to the CMs on the data-out line, wherein the CSR bus further comprises a common shift control line and a common write control line coupling the HM to the CMs, and wherein when the HM asserts a shift signal on the shift control line all of the CMs store, at least temporarily, the provided data and address responsive to the clock enable signal.

22. The method of claim 20, wherein each of the CMs compare the address provided by the HM with an associated address and the CM whose associated address matches the address provided by the HM stores the data in the one or more associated registers responsive to a write signal provided by the HM on the write control line.

* * * * *